United States Patent
Foltin

(10) Patent No.: US 10,421,425 B2
(45) Date of Patent: Sep. 24, 2019

(54) OCCUPANT PROTECTION DEVICE FOR A VEHICLE, AND CORRESPONDING VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 15/821,025

(22) Filed: Nov. 22, 2017

(65) Prior Publication Data

US 2018/0148010 A1 May 31, 2018

(30) Foreign Application Priority Data

Nov. 28, 2016 (DE) ........................ 10 2016 223 544

(51) Int. Cl.
| | |
|---|---|
| B60R 21/214 | (2011.01) |
| B60R 21/203 | (2006.01) |
| B60R 21/213 | (2011.01) |
| B60R 21/015 | (2006.01) |
| B62D 1/183 | (2006.01) |
| B60R 21/232 | (2011.01) |
| B60R 21/013 | (2006.01) |
| B60R 21/01 | (2006.01) |

(Continued)

(52) U.S. Cl.
CPC ...... B60R 21/01512 (2014.10); B60R 21/013 (2013.01); B60R 21/203 (2013.01); B60R 21/213 (2013.01); B60R 21/214 (2013.01); B60R 21/232 (2013.01); B62D 1/183 (2013.01); B60R 2021/0004 (2013.01); B60R 2021/01211 (2013.01); B60R 2021/01231 (2013.01); B60R 2021/23107 (2013.01)

(58) Field of Classification Search
CPC ............ B60R 21/01512; B60R 21/013; B60R 21/214; B60R 21/203; B60R 21/232; B60R 21/213; B60R 21/015; B60R 2021/01231; B60R 2021/01211; B60R 2021/0004; B60R 2021/23107; B62D 1/183
USPC .......................................... 280/730.1; 701/45
See application file for complete search history.

(56) References Cited

U.S. PATENT DOCUMENTS

| | | | |
|---|---|---|---|
| 6,224,088 B1 * | 5/2001 | Lohavanijaya | ... B60R 21/23184 280/728.1 |
| 6,431,586 B1 * | 8/2002 | Eyrainer | ............... B60R 21/213 280/730.1 |
| 9,108,584 B2 * | 8/2015 | Rao | ........................ B60R 21/017 |

FOREIGN PATENT DOCUMENTS

DE 102005001177 A1 9/2005

* cited by examiner

*Primary Examiner* — Keith J Frisby
(74) *Attorney, Agent, or Firm* — Norton Rose Fulbright US LLP; Gerard Messina

(57) ABSTRACT

An occupant protection device for a vehicle, including an airbag system which, for protecting an occupant, includes at least one first airbag whose expansion movement in the vehicle longitudinal direction extends toward the occupant and in the vehicle vertical direction extends from bottom to top, and a second airbag whose expansion movement in the vehicle longitudinal direction extends toward the occupant and in the vehicle vertical direction extends from top to bottom, at least one sensor system that detects collision-relevant and/or occupant-relevant information, and an evaluation and control unit that evaluates the collision-relevant and/or occupant-relevant information and controls the airbag system as a function of the evaluation.

14 Claims, 3 Drawing Sheets

(51) Int. Cl.
*B60R 21/00* (2006.01)
*B60R 21/231* (2011.01)

OCCUPANT PROTECTION DEVICE FOR A VEHICLE, AND CORRESPONDING VEHICLE

CROSS REFERENCE

The present application claims the benefit under 35 U.S.C. § 119 of German Patent Application No. DE 102016223544.3 filed on Nov. 28, 2016, which is expressly incorporated herein by reference in its entirety.

FIELD

The present invention is directed to an occupant protection device for a vehicle. Moreover, the present invention relates to a vehicle that includes such an occupant protection device.

BACKGROUND INFORMATION

In conventional vehicles, an airbag for protecting the driver is generally mounted in the steering wheel. This type of airbag is also referred to as a "steering wheel airbag." In the event of a collision, the steering wheel airbag is triggered and is intended to prevent the driver's head from striking the steering wheel. The airbag is supported on the steering wheel and moves toward the driver. Strong accelerations occur during the triggering, in particular in the area directly at the steering wheel. Articles or objects situated on the steering wheel may then be dangerously hurled through the interior of the vehicle. There are similar airbag systems for the front passenger, in which the airbag emerges from the dashboard. However, for the front passenger airbag there are already approaches in which the airbag is situated at the roof frame of the vehicle and which when triggered opens along the windshield, supported on the dashboard and the windshield, and then moves toward the front passenger. This type of airbag is also referred to as a "roof airbag."

In future highly automated vehicles, the aim is not only to reduce traffic accidents, but in particular also to increase the driving comfort. The driver gives the driving task to a robot driver or a system that may make driving decisions, and the driver may pursue other activities. Thus, in automated driving operation the driver may, for example, read a book or operate a mobile device such as a mobile telephone, a laptop, etc. In a normal working position which the driver would like to assume in the automated driving operation, such objects would be situated between the steering wheel airbag and the driver's head. In the event of an accident and an expanding steering wheel airbag, such objects may endanger the driver, or as "ricochets," also other occupants. To provide more space for the driver, adjustable steering wheels, for example, may be used in such vehicles. Thus, the steering wheel may be pushed, for example, into a stored position in the middle of the dashboard or into a receptacle in the dashboard to provide the driver with more space during the automated driving operation. The driver thus obtains more room immediately in front of him/her. Consequently, in addition to the steering wheel airbag, a roof airbag may also be used for protecting the driver.

A method and a device for protecting vehicle occupants are described in German Patent Application No. DE 10 2005 001 177 A1, which include a sensor that responds to a side impact event and/or a rollover event in order to generate a collision event signal. A first occupant protection device is inflatable into a first position situated next to a corresponding vehicle seat. A second first occupant protection device is inflatable into a second position situated in front of the corresponding vehicle seat. A control device responds to the collision event signal and immediately activates the inflation of the first occupant protection device. After a predetermined time period elapses following the inflation of the first occupant protection device, the control device activates the inflation of the second occupant protection device.

SUMMARY

An occupant protection device for a vehicle, in accordance with an example embodiment of the present invention, may have the advantage that first pieces of information concerning a state of an adjustable steering wheel and second pieces of information concerning an expansion space of an airbag are incorporated into a decision regarding the triggering of airbags of an airbag system. The selection and cascading of the airbags of the airbag system to be triggered may take place for protecting the driver as a function of the steering wheel status and the presence of an object between the airbag and the driver, and may advantageously be adapted to instantaneous conditions in the vehicle interior and to an instantaneous driving situation.

Specific embodiments of the present invention provide an occupant protection device for a vehicle, including an airbag system which for protecting an occupant includes at least one first airbag whose expansion movement in the vehicle longitudinal direction extends toward the occupant and in the vehicle vertical direction extends from bottom to top, and a second airbag whose expansion movement in the vehicle longitudinal direction extends toward the occupant and in the vehicle vertical direction extends from top to bottom, at least one sensor system that detects collision-relevant and/or occupant-relevant information, and an evaluation and control unit that evaluates the collision-relevant and/or occupant-relevant information and controls the airbag system as a function of the evaluation. The collision-relevant and/or occupant-relevant information include(s) first pieces of information concerning a steering wheel and second pieces of information concerning an expansion space of the first airbag, the evaluation and control unit deducing from the first pieces of information a first piece of status information that indicates a stored state of the steering wheel, or a second piece of status information that indicates a normal state of the steering wheel, and the evaluation and control unit deducing from the second pieces of information a third piece of status information that indicates an object that is present in the expansion space of the first airbag, or a fourth piece of status information that indicates a free expansion space of the first airbag.

In addition, a vehicle that includes a vehicle interior, such an occupant protection device, and an adjustable steering wheel that may be moved into a stored position or into a normal position is provided.

In the present context, the evaluation and control unit may be understood to mean an electrical device, for example a control unit, in particular an airbag control unit, which processes and evaluates detected sensor signals. The evaluation and control unit may include at least one interface which may have a hardware and/or software design. In a hardware design, the interfaces may be part of a so-called system ASIC, for example, that contains various functions of the evaluation and control unit. However, it is also possible for the interfaces to be dedicated, integrated circuits, or to be at least partially made up of discrete components. In a software design, the interfaces may be software modules that are present on a microcontroller, for example, in addition to other software modules. Also advantageous is a computer program product including program code that is stored on a machine-readable carrier such as a semiconductor memory, a hard disk, or an optical memory, and used for carrying out the evaluation when the program is executed by the evaluation and control unit.

In the present context, a sensor system is understood to mean a unit that includes at least one sensor element that directly or indirectly detects a physical variable or a change in a physical variable and preferably converts it into an electrical sensor signal. This may take place, for example, via the transmission and/or the reception of acoustic waves and/or electromagnetic waves, and/or via a magnetic field or the change in a magnetic field.

Also possible are cameras or optical sensor elements that include, for example, a photoplate and/or a fluorescent surface and/or a semiconductor that detect(s) the occurrence or the intensity, the wavelength, the frequency, the angle, etc., of the received wave, for example infrared sensor elements. Likewise possible is an acoustic sensor element, for example an ultrasonic sensor element and/or a high-frequency sensor element and/or a radar sensor element and/or a sensor element that responds to a magnetic field, for example a Hall sensor element and/or a magnetoresistive sensor element, and/or an inductive sensor element that records the change in a magnetic field, for example via the voltage that results from magnetic induction.

Advantageous improvements of the occupant protection device for a vehicle and the vehicle in accordance with the present invention are described herein.

It is particularly advantageous if a steering wheel sensor system may detect the first pieces of information concerning the steering wheel and output them to the evaluation and control unit. Such a steering wheel sensor system may include a position sensor, for example, that recognizes an instantaneous position of the steering wheel in a stored position or in a normal position.

In one advantageous embodiment of the occupant protection device according to the present invention, an interior sensor system may detect the first pieces of information concerning the steering wheel and/or the second pieces of information concerning the expansion space of the first airbag and/or the occupant-relevant pieces of information and output them to the evaluation and control unit. Such an interior sensor system may advantageously include at least one camera that detects or records the interior of the vehicle. The evaluation and control unit uses an image evaluation function in order to recognize, for example, the instantaneous position of the steering wheel and/or an object in the expansion space of the first airbag and/or occupants in the vehicle interior, on the images recorded by the camera.

In another advantageous embodiment of the occupant protection device, a collision sensor system may detect the collision-relevant information and output it to the evaluation and control unit. Such a collision sensor system includes, for example, an anticipatory sensor unit that monitors the vehicle surroundings, and/or an impact sensor system. By evaluating the collision-relevant information detected by the collision sensor system, the evaluation and control unit recognizes an imminent or occurring collision and activates the airbags of the occupant protection device in order to protect the driver. Of course, the occupant protection device may include even further airbags for protecting the other occupants. In addition to the airbags, the occupant protection device may also include other suitable restraint means for the occupants, such as seat belt tensioners, etc.

In another advantageous embodiment of the occupant protection device, the evaluation and control unit may check the status information of the steering wheel and the status information of the expansion space of the first airbag when an imminent collision is recognized. The evaluation and control unit may decide, as a function of the checked status information, the intensity of activation of the particular airbag via corresponding trigger units for protecting a driver, and whether only the first airbag, or only the second airbag, or initially the second airbag and then the first airbag, is/are activated. Thus, for protecting the driver, the evaluation and control unit may, for example, activate the first airbag only when the second piece of status information and the fourth piece of status information apply, i.e., when the steering wheel is in the normal position and no object is present in the expansion space of the first airbag. Furthermore, for protecting the driver, the evaluation and control unit may activate the second airbag only when the first piece of status information and the third piece of status information or fourth piece of status information apply, i.e., when the steering wheel is in its stored position and the second airbag is able to deploy its full protective action without interference from the steering wheel. In addition, for protecting the driver, the evaluation and control unit may activate the second airbag, or initially activate the second airbag and then the first airbag only when the second piece of status information and the third piece of status information apply, i.e., when the steering wheel is in the normal position and an object is present in the expansion space of the first airbag. Although the protective action of the second airbag is not as good as the protective action of the first airbag for a steering wheel in the normal position; however, the object in the expansion space of the first airbag is pressed onto the lap of the driver by the expansion of the second airbag, and the driver is not struck on the head by the expansion of the first airbag. Endangerment of the driver or the other occupants may be advantageously prevented in this way.

In another advantageous embodiment of the occupant protection device, the evaluation and control unit may evaluate the second pieces of information concerning the expansion space of the first airbag in order to classify an object, recognized in the expansion space of the first airbag, with regard to its hazard potential. Thus, the evaluation and control unit may, for example, activate the second airbag, or initially activate the second airbag and then the first airbag, only when the second piece of status information and the third piece of status information apply and the recognized object is classified as "hazardous." Hazardous objects may be understood to mean, for example, heavy and/or hard articles such as a mobile telephone or a laptop, etc. In addition, the evaluation and control unit may activate the first airbag only when the second piece of status information and the third piece of status information apply and the recognized object is classified as "nonhazardous." Nonhazardous objects may be understood to mean, for example, lightweight and/or soft articles such as a thin newspaper or a magazine. Furthermore, the evaluation and control unit may activate the second airbag, or initially activate the second airbag and then the first airbag, only when the second piece of status information and the third piece of status information apply and the recognized object is classified as "moderately hazardous," and additional persons are recognized in the vehicle interior. In addition, the evaluation and control unit may activate the first airbag only when the second piece of status information and the third piece of status information apply and the recognized object is classified as "moderately hazardous," and no additional persons are recognized in the vehicle interior. "Moderately hazardous" objects may be understood to mean, for example, articles such as a lightweight book or a paper cup containing liquid, etc., which are not able to cause severe injuries. This means that when the driver is alone in the vehicle, injury to the driver by the object is being accepted, since in return, the driver is protected by a first airbag that is optimized for driving with the steering wheel. When additional occupants are present in the vehicle, all persons are affected by the hazard from the object, so that this hazard is minimized for all occupants of the vehicle by activating the second airbag. However, the driver may then have less protection, since use cannot be made of an airbag that is optimized for use of the steering wheel.

In one advantageous embodiment of the vehicle, when an automated driving function is carried out the steering wheel is in the stored position, and during normal operation is in the normal position. The first airbag may preferably be designed as a steering wheel airbag and be situated in an impact absorber on the steering wheel. The second airbag may preferably be designed as a roof airbag and be situated in the area of a roof frame.

Exemplary embodiments of the present invention are illustrated in the figures and explained in greater detail below. In the drawings, identical reference numerals denote components or elements that carry out the same or similar functions.

DETAILED DESCRIPTION OF EXAMPLE EMBODIMENTS

Figure 2:
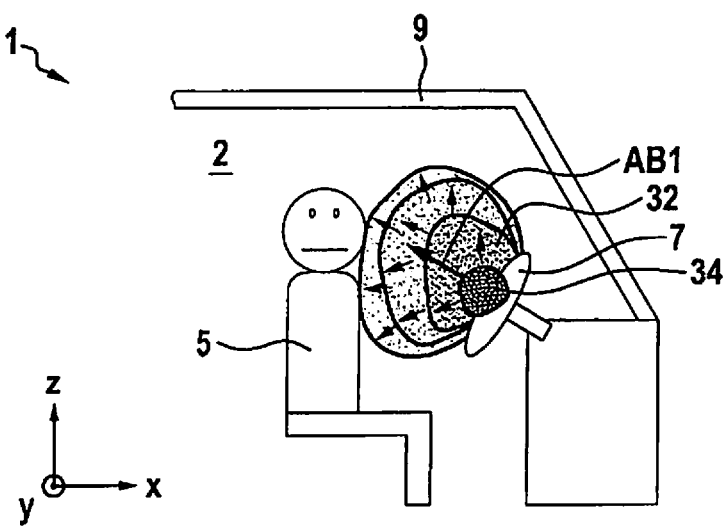
FIG. 2 shows a schematic illustration of a front area of a vehicle interior together with the occupant protection device for a vehicle from FIG. 1, in a first trigger situation.
Figure 3:
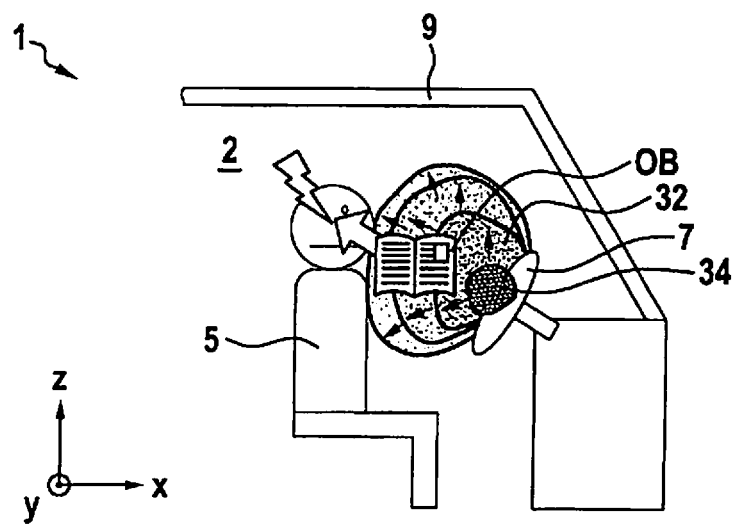
FIG. 3 shows a schematic illustration of the hazard potential of the first trigger situation illustrated in FIG. 2, with an object situated in the expansion space of a first airbag.
Figure 4:
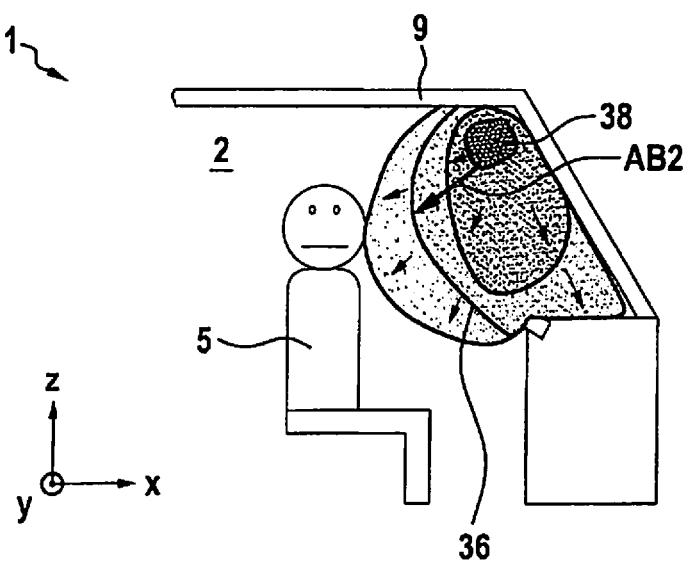
FIG. 4 shows a schematic illustration of a front area of a vehicle interior, together with the occupant protection device for a vehicle from FIG. 1, in a second trigger situation.
Figure 5:
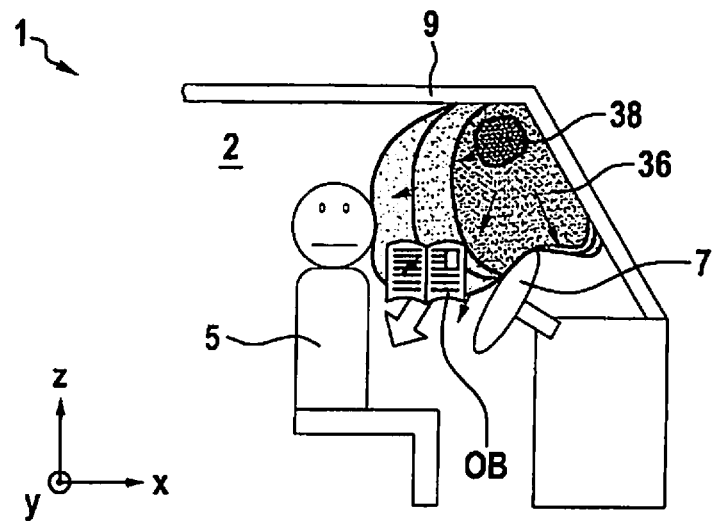
FIG. 5 shows a schematic illustration of a front area of a vehicle interior, together with the occupant protection device for a vehicle from FIG. 1, in a third trigger situation.

As is shown in FIGS. 1 through 6, the illustrated exemplary embodiment of a vehicle 1 includes a vehicle interior 2, an occupant protection device 3, and an adjustable steering wheel 7 that may be moved into a stored position illustrated in FIG. 4, or into a normal position illustrated in FIGS. 2, 3, 5, 6. Steering wheel 7 may be in the stored position or in the normal position when an automated driving function is carried out. When the automated driving function is carried out, steering wheel 7 is preferably moved into the stored position in order to provide driver 5 with more room for other activities. Steering wheel 7 is in the normal position during normal operation.

As is further shown FIGS. 1 through 6, for a vehicle 1 in the illustrated exemplary embodiment, occupant protection device 3 includes an airbag system 30, at least one sensor system 22, 24, 26 that detects collision-relevant and/or occupant-relevant information, and an evaluation and control unit 20 that evaluates the collision-relevant and/or occupant-relevant information and controls airbag system 30 as a function of the evaluation. For protecting an occupant, in the present case driver 5, the airbag system includes at least one first airbag 32, whose expansion movement AB1 extends in vehicle longitudinal direction x toward the occupant and in vehicle vertical direction z extends from bottom to top, and a second airbag 36, whose expansion movement AB2 in vehicle longitudinal direction x extends toward the occupant and in vehicle vertical direction z extends from top to bottom. The collision-relevant and/or occupant-relevant information include(s) first pieces of information concerning steering wheel 7, and second pieces of information concerning an expansion space of first airbag 32. Evaluation and control unit 20 deduces from the first pieces of information a first piece of status information that indicates a stored state of steering wheel 7, or a second piece of status information that indicates a normal state of steering wheel 7.

In addition, evaluation and control unit 20 deduces from the second pieces of information a third piece of status information that indicates an object OB that is present in the expansion space of first airbag 32, or a fourth piece of status information that indicates a free expansion space of first airbag 32.

Figure 1:
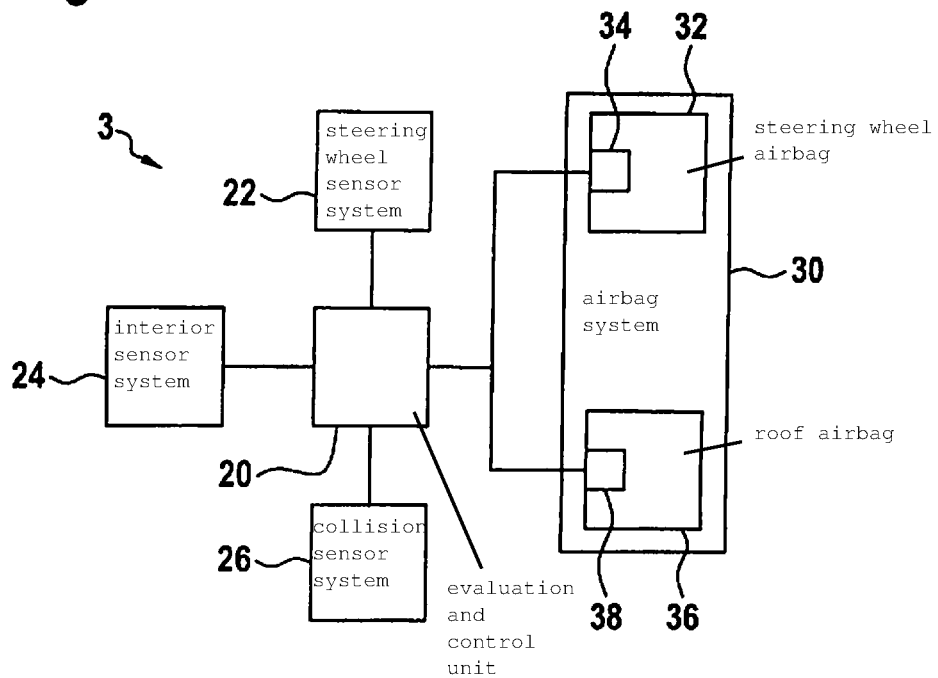
FIG. 1 shows a schematic block diagram of one exemplary embodiment of an occupant protection device for a vehicle.

As is further shown in FIG. 1, in the illustrated exemplary embodiment a steering wheel sensor system 22 detects the first pieces of information concerning steering wheel 7 and outputs them to evaluation and control unit 20. In addition, an interior sensor system 24 detects the second pieces of information concerning the expansion space of first airbag 32 and the occupant-relevant information, and outputs them to evaluation and control unit 20. In the illustrated exemplary embodiment, interior sensor system 24 includes multiple CCD cameras, not illustrated in greater detail, which record the vehicle interior from multiple perspectives. Evaluation and control unit 20 uses an image evaluation function in order to recognize on the recorded images an object in the expansion space of first airbag 32 and/or occupants in vehicle interior 2. Evaluation and control unit 20 evaluates the occupant-relevant information of interior sensor system 24 in order to recognize further occupants in addition to driver 5 in vehicle interior 2. In addition, evaluation and control unit 20 may also evaluate the recorded images to ascertain the instantaneous position or the state of steering wheel 7. Furthermore, a collision sensor system 26 detects the collision-relevant information and outputs it to evaluation and control unit 20. In addition to illustrated airbag system 30 for protecting driver 5, occupant protection device 3 may include even further airbag systems, not illustrated, for protecting a front passenger and occupants in the rear area of vehicle interior 2.

Figure 6:
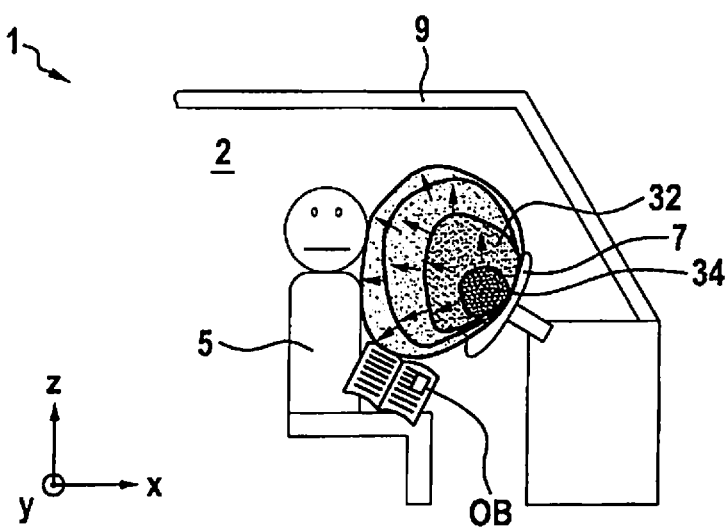
FIG. 6 shows a schematic illustration of a front area of a vehicle interior, together with the occupant protection device for a vehicle from FIG. 1, in a fourth trigger situation.

As is further shown in FIGS. 2, 3, 6, in the illustrated exemplary embodiment, first airbag 32 is designed as a steering wheel airbag and is situated in an impact absorber, not described in greater detail, on steering wheel 7. As is further apparent from FIGS. 4, 5, in the illustrated exemplary embodiment, second airbag 32 is designed as a roof airbag and is situated in the area of a roof frame, not described in greater detail.

As is shown in FIGS. 2 through 6, during highly automated driving, steering wheel 7 may be moved into the stored state, illustrated in FIG. 4, to provide more room for driver 5. In this situation, in the event of a collision, for protecting driver 5 evaluation and control unit 20 activates only second airbag 36 or roof airbag via a corresponding second trigger unit 38. A front passenger, not illustrated in greater detail, may in principle be well protected by an associated roof airbag. As is further apparent from FIG. 4, the driver has the same amount of room as a front passenger when steering wheel 7 is in the stored state, and may be protected with the same means as for the front passenger. However, a roof airbag deploys its full protective action only when steering wheel 7 is not in the way. Therefore, an across-the-board activation or triggering of the roof airbag is not advisable. For this reason, first airbag 32, designed as a steering wheel airbag, cannot be dispensed with. The exclusive use of first airbag 32, designed as a steering wheel airbag, is not meaningful in a vehicle 1 with an automated driving function, since during activation or triggering of first airbag 32 via a corresponding first trigger unit 34, driver 5 could be holding in the hand an object OB which is then hurled into the air, as is further apparent from FIG. 3. Flying objects 5 may also endanger other occupants in the vehicle interior. Due to use of second airbag 36, designed as a roof airbag, object OB is pressed onto the lap of driver 5, as is apparent from FIG. 5. First airbag 32, designed as a steering wheel airbag, may subsequently be activated, as is shown in FIG. 6.

In the illustrated exemplary embodiment, during a recognized imminent collision, evaluation and control unit 20 checks the status information of steering wheel 7 and the status information of the expansion space of first airbag 32, and decides, as a function of the checked status information, the intensity of activation of the particular airbag 32, 34 via corresponding trigger units 34, 38 for protecting driver 5, and whether only first airbag 32, or only second airbag 36, or initially second airbag 34 and then first airbag 36, is/are activated.

As is further shown in FIG. 4, second airbag 36, designed as a roof airbag, is triggered when the steering wheel is retracted into the stored position or is not in the normal position for manual driving. As is further shown in FIG. 2, first airbag 32, designed as a steering wheel airbag, is triggered during normal driving and steering wheel 7 is extended. However, first airbag 32, designed as a steering wheel airbag, is not triggered when steering wheel 7 is extended and driver 5 is holding an object OB between first airbag 32 and his/her head. As is further shown in FIG. 5, second airbag 36, designed as a roof airbag, is triggered instead in order to press object OB, recognized in the trigger area of first airbag 32, onto the lap of driver 5. Although the protective action is not as good as when first airbag, 32, designed as a steering wheel airbag, is triggered, object OB does not strike the driver on the head. As is further apparent from FIG. 6, in the illustrated exemplary embodiment, after second airbag 36 is triggered, first airbag 32 is also triggered in order to further improve the protective action for driver 5.

In another specific embodiment, not illustrated, of occupant protection device 3, evaluation and control unit 20 classifies an object OB recognized in the expansion space of first airbag 32 with regard to its hazard potential, based on the second pieces of information concerning the expansion space of first airbag 32. The object is classified in various groups, for example "hazardous" and "nonhazardous." In particular hard and/or heavy articles such as laptops or mobile telephones are classified as "hazardous." In particular lightweight and/or soft articles such as thin newspapers are classified as "nonhazardous." For a classification as "hazardous," only second airbag 36, designed as a roof airbag, is utilized, or second airbag 36, designed as a roof airbag, is initially utilized, followed by first airbag 32, designed as a steering wheel airbag. For a classification as "nonhazardous," only first airbag 32, designed as a steering wheel airbag, is utilized, since the protection for driver 5 due to optimized first airbag 32 designed as a steering wheel airbag is generally better than the protection by second airbag 36, designed as a roof airbag, which is optimized for the absence of steering wheel 7. In addition, the presence of additional occupants may be taken into account in activating airbags 32, 36.

When there is great risk that the additional occupants may be endangered by the flying article, only second airbag 36, designed as a roof airbag, is activated, or second airbag 36, designed as a roof airbag, is initially activated and then first airbag 32, designed as a steering wheel airbag, is activated. This may also be taken into account in particular in the classification of objects OB and sorting into groups. In addition to the classification as "hazardous" and "nonhazardous," object OB may also be classified as "moderately hazardous" when it is not possible for the driver to be seriously injured by the object, and the article is, for example, a lightweight book or a paper cup filled with liquid. When additional occupants are present in vehicle interior 2, all persons are at risk of being hit by object OB. This means that in the case of an object classified as "moderately hazardous," only first airbag 32, designed as a steering wheel airbag, is activated when driver 5 is alone in vehicle interior 2, and a slight injury to driver 5 is thus accepted. In return, driver 5 is protected by first airbag 32, designed as a steering wheel airbag that is optimized for driving with the steering wheel. However, when additional occupants are present in vehicle interior 2, only second airbag 36, designed as a roof airbag, is activated, or second airbag 36, designed as a roof airbag, is initially activated, followed by first airbag 32, designed as a steering wheel airbag, in order to press object OB, classified as "moderately hazardous," onto the lap of driver 5 and thus minimize the risk from object OB for all occupants of vehicle interior 2.

In addition, evaluation and control unit 20 may make an adaptation of the intensity of first airbag 32, designed as a steering wheel airbag, and of second airbag 36, designed as a roof airbag. This may be achieved, for example, by controlling outlet valves of corresponding airbag 32, 36 and/or by multistage triggerings and/or by a valve adaptation of a cold gas generator, not illustrated. A compromise between "protect driver and occupants from object" and "protect driver with optimized airbag" may thus be found. In addition, second airbag 36 may be optimized for pushing away objects OB recognized in the expansion space of first airbag 32 when first airbag 32 is subsequently used for the optimized protection of driver 5. This has the advantage that airbags 32, 36 may be better coordinated with one another.

What is claimed is:

1. An occupant protection device for a vehicle, comprising:
    an airbag system which, for protecting an occupant, includes at least one first airbag whose expansion movement in a vehicle longitudinal direction extends toward the occupant and in a vehicle vertical direction extends from bottom to top, and a second airbag whose expansion movement in the vehicle longitudinal direction extends toward the occupant and in the vehicle vertical direction extends from top to bottom;
    at least one sensor system that detects at least one of collision-relevant information and occupant-relevant information; and
    an evaluation and control unit that evaluates the at least one of the collision-relevant information and the occupant-relevant information and controls the airbag system as a function of the evaluation;

wherein the at least one of the collision-relevant and the occupant-relevant information include first pieces of information concerning a steering wheel and second pieces of information concerning an expansion space of the first airbag, the evaluation and control unit deducing from one of: (i) the first pieces of information a first piece of status information that indicates a stored state of the steering wheel, or (ii) a second piece of status information that indicates a normal state of the steering wheel, and wherein the evaluation and control unit deduces from the second pieces of information one of: (i) a third piece of status information that indicates an object that is present in the expansion space of the first airbag, or (ii) a fourth piece of status information that indicates a free expansion space of the first airbag.

2. The occupant protection device as recited in claim 1, wherein a steering wheel sensor system detects the first pieces of information concerning the steering wheel and outputs the first pieces of information concerning the steering wheel to the evaluation and control unit.

3. The occupant protection device as recited in claim 1, wherein an interior sensor system detects at least one of: (i) the first pieces of information concerning the steering wheel, (ii) the second pieces of information concerning the expansion space of the first airbag, and (iii) the occupant-relevant pieces of information, and outputs the detected information to the evaluation and control unit.

4. The occupant protection device as recited in claim 3, wherein the evaluation and control unit evaluates the occupant-relevant information of the interior sensor system with regard to occupants present in the vehicle interior.

5. The occupant protection device as recited in claim 1, wherein a collision sensor system detects the collision-relevant information and outputs the collision-relevant information to the evaluation and control unit.

6. The occupant protection device as recited in claim 5, wherein the evaluation and control unit checks the status information of the steering wheel and the status information of the expansion space of the first airbag when an imminent collision is recognized, the evaluation and control unit deciding, as a function of the checked status information, the intensity of activation of the particular airbag via corresponding trigger units for protecting a driver, and whether one of only the first airbag, only the second airbag, or initially the second airbag and then the first airbag, is activated.

7. The occupant protection device as recited in claim 6, wherein for protecting the driver, the evaluation and control unit activates the first airbag only when the second piece of status information and the fourth piece of status information apply, and for protecting the driver, the evaluation and control unit activates the second airbag only when the first piece of status information and the third piece of status information or fourth piece of status information apply.

8. The occupant protection device as recited in claim 6, wherein for protecting the driver, the evaluation and control unit activates one of the second airbag, or initially activates the second airbag and then the first airbag, only when the second piece of status information and the third piece of status information apply.

9. The occupant protection device as recited in claim 6, wherein the evaluation and control unit evaluates the second pieces of information concerning the expansion space of the first airbag to classify an object, recognized in the expansion space of the first airbag, with regard to its hazard potential.

10. The occupant protection device as recited in claim 9, wherein the evaluation and control unit one of activates the second airbag, or initially activates the second airbag and then the first airbag, only when the second piece of status information and the third piece of status information apply and the recognized object is classified as "hazardous," the evaluation and control unit activates the first airbag only when the second piece of status information and the third piece of status information apply and the recognized object is classified as "nonhazardous," the evaluation and control unit one of activates the second airbag, or initially activates the second airbag and then the first airbag, only when the second piece of status information and the third piece of status information apply and the recognized object is classified as "moderately hazardous" and additional persons are recognized in the vehicle interior, and the evaluation and control unit activates the first airbag only when the second piece of status information and the third piece of status information apply and the recognized object is classified as "moderately hazardous" and no additional persons are recognized in the vehicle interior.

11. A vehicle, comprising a vehicle interior, an occupant protection device, and an adjustable steering wheel that is movable into a stored position and into a normal position, wherein the occupant protection device includes:

an airbag system which, for protecting an occupant, includes at least one first airbag whose expansion movement in a vehicle longitudinal direction extends toward the occupant and in a vehicle vertical direction extends from bottom to top, and a second airbag whose expansion movement in the vehicle longitudinal direction extends toward the occupant and in the vehicle vertical direction extends from top to bottom;

at least one sensor system that detects at least one of collision-relevant information and occupant-relevant information; and an evaluation and control unit that evaluates the at least one of the collision-relevant information and the occupant-relevant information and controls the airbag system as a function of the evaluation;

wherein the at least one of the collision-relevant and the occupant-relevant information include first pieces of information concerning a steering wheel and second pieces of information concerning an expansion space of the first airbag, the evaluation and control unit deducing from one of: (i) the first pieces of information a first piece of status information that indicates a stored state of the steering wheel, or (ii) a second piece of status information that indicates a normal state of the steering wheel, and wherein the evaluation and control unit deduces from the second pieces of information one of: (i) a third piece of status information that indicates an object that is present in the expansion space of the first airbag, or (ii) a fourth piece of status information that indicates a free expansion space of the first airbag.

12. The vehicle as recited in claim 11, wherein the vehicle is configured so that when an automated driving function is carried out, the steering wheel is in the stored position, and during normal operation is in the normal position.

13. The vehicle as recited in claim 11, wherein the first airbag is a steering wheel airbag and is situated in an impact absorber on the steering wheel.

14. The vehicle as recited in claim 11, wherein the second airbag is a roof airbag and is situated in an area of a roof frame of the vehicle.

* * * * *